United States Patent [19]
Yoshida

[11] Patent Number: 5,894,546
[45] Date of Patent: *Apr. 13, 1999

[54] IMAGE PROCESSING APPARATUS FOR CONVERTING MULTIVALUED IMAGE INTO BINARY IMAGE AND OUTPUTTING BINARY IMAGE

[75] Inventor: Shigeo Yoshida, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/431,319

[22] Filed: Apr. 28, 1995

Related U.S. Application Data

[63] Continuation of application No. 08/088,056, Jul. 8, 1993, abandoned.

[30] Foreign Application Priority Data

Jul. 9, 1992 [JP] Japan ................... 4-182459

[51] Int. Cl.$^6$ ................ G06F 15/00; H04N 1/32
[52] U.S. Cl. ............ 395/117; 395/109; 358/442; 358/467; 358/468
[58] Field of Search ................ 358/527, 540, 358/448, 470, 467, 462, 456, 515, 501, 539, 407, 425, 468, 444; 341/56, 102, 103; 395/734, 737, 739, 741, 101, 103, 105, 106, 109, 111, 112, 113, 114, 117

[56] References Cited

U.S. PATENT DOCUMENTS

| | | | |
|---|---|---|---|
| 3,918,029 | 11/1975 | Lemelson | 340/146.35 Y |
| 4,606,069 | 8/1986 | Johnsen | 382/56 |
| 4,684,997 | 8/1987 | Romeo et al. | 358/470 |
| 4,905,097 | 2/1990 | Watanabe et al. | 358/456 |
| 5,006,937 | 4/1991 | Nonoshita et al. | 358/456 |
| 5,010,498 | 4/1991 | Miyata | 364/519 |
| 5,162,721 | 11/1992 | Sato | 320/15 |
| 5,231,482 | 7/1993 | Murakami et al. | 358/539 |
| 5,241,397 | 8/1993 | Yamada | 358/444 |
| 5,327,264 | 7/1994 | Iyama | 358/515 |
| 5,363,454 | 11/1994 | Udagawa et al. | 382/17 |
| 5,495,542 | 2/1996 | Shimomura et al. | 382/254 |

Primary Examiner—Edward L. Coles
Assistant Examiner—Madeleine Av Nguyen
Attorney, Agent, or Firm—Fitzpatrick, Cella, Harper & Scinto

[57] ABSTRACT

In an image processing apparatus including a display device for displaying a binary image stored in a display binary memory and a printer for printing a binary image stored in a printing binary memory, a multi-value-binary conversion circuit for converting a multivalued image stored in a multivalued memory into a binary image is selectively connected to the display binary image memory or the printing binary image memory while arbitration between a display request and a printing request is performed. The multi-value-binary conversion circuit is commonly used for display and printing.

9 Claims, 10 Drawing Sheets

IMAGE PROCESSING APPARATUS FOR CONVERTING MULTIVALUED IMAGE INTO BINARY IMAGE AND OUTPUTTING BINARY IMAGE

This application is a continuation of application Ser. No. 08/088,056 filed Jul. 8, 1993, now abandoned.

BACKGROUND OF THE INVENTION

1. Field of the Invention

The present invention relates to an image processing apparatus having display and printing devices to output a binary image.

2. Related Background Art

A conventional computer basically prints only characters.

A character code is sent from a conventional computer to a printer, the character code is converted into a character bit image, and the character bit image is output using a printing head, laser scanning, and the like. In recent years, computer processing capacity has been remarkably increased, and graphics using a color image such as a natural image can be expressed.

A color image cannot be printed using simple binary colors. A natural expression of a color image cannot be achieved without expressing it as a multivalued image.

It is, however, difficult for many printers such as an ink-jet printer to perform multivalued expressions due to their structural limitations. For this reason, multivalued expressions (halftone expressions) must be achieved by binary printing.

To print a color image such as a natural image, multi-value-binary conversion is performed, and then the converted image is printed.

To display a color image, a multivalued display operation is generally performed because a display device such as a CRT can easily perform multivalued expression. It is, however, difficult for a passive matrix flat display device such as a low-cost LCD to perform multivalued expression.

Software processing cannot be standardized due to different multivalued data expression methods in display and printing, resulting in inconvenience.

In displaying a high-resolution image, multivalued expressions cause a decrease in display speed or an increase in file size because the multivalued expressions require a large memory capacity. For example, to perform a 24-bit display (using, e.g. 8-bit R, G, and B components) at a resolution of 200 dpi in an A4 size, a frame memory requires a capacity of 12 Mbytes. This capacity causes overload of the state-of-the-art computer processing capacity.

Printing and display resolutions have been increasing year by year. When a multivalued image is displayed and printed, the memory and processing capacities required are assumed to increase in arithmetic progression.

It is convenient to express a multivalued image in a binary system in printing and displaying a high-resolution image. To express a multivalued image in a binary system, a halftone expression method such as a dither method or an error diffusion method must be used. This method requires processing between pixels constituting an image (i.e., produces for each pixel a value which is based on the input values of several pixels), and a considerably large processing capacity is required to perform this pixel processing using only software (i.e., without at least some dedicated hardware).

For this reason, multi-value-binary conversion is generally performed by hardware.

Various figures and outline fonts used in vector graphics commands can be drawn at a higher speed using an external figure drawing processor than using a printing source computer or the internal processor of a printer.

Judging from the above circumstances, display and printing operations must be efficiently processed in one block, which functions as various circuits, in favor of a high-speed operation. However, the image display and printing operations are not always simultaneously performed, and different images may be displayed. Therefore, a multi-value-binary conversion circuit must independently perform display processing and printing processing.

SUMMARY OF THE INVENTION

It is, therefore, an object of the present invention to display and print an image at high speed in an image processing apparatus comprising display and printing devices.

It is another object of the present invention to save the storage capacity of a memory in an image processing apparatus comprising display and printing devices.

It is still another object of the present invention to provide an image processing apparatus which also serves as various display and printing circuits, and particularly a multi-value-binary circuit.

According to one aspect, the present invention which achieves these objectives relates to an image processing apparatus comprising multivalued storage means for storing a multivalued image, display binary image storage means for storing a display binary image, binary image display means for displaying a binary image from the display binary image storage means, printing binary image storage means for storing a printing binary image, binary image printing means for printing an image from the printing binary image storage means, multi-value-binary converting means for converting the multivalued image from the multivalued image storage means into a binary image, and control means for switching the multi-value-binary converting means to the display binary image storage means or the printing binary image storage means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

In this embodiment, a multivalued memory image generally written by a CPU is pixel-density-converted into a desired size. The converted image is then converted into a binary image by a multi-value-binary conversion circuit commonly used in display and printing, and the resultant binary image is displayed or printed.

In arbitration of multi-value-binary conversion for a display binary memory and a printing binary memory, a display request basically has priority over a printing request to prevent flickering of the screen display. Multi-value-binary conversion is disabled during data transfer time of a video dual port memory. The remaining time is shared by display and printing operations to generate an image.

A drawing processor capable of drawing vector graphics and the like at high speed can be shared by the display device and the printer. The above arbitration can also be performed in this drawing processor.

When the above control method is used, printing binary memory data can only be intermittently generated, and printing may be intermittently performed accordingly. In this case, a printer having a mechanism capable of interrupting printing at a printing head is required.

[First Embodiment]

The first embodiment of the present invention will be described in detail with reference to the accompanying drawings.

Figure 1:
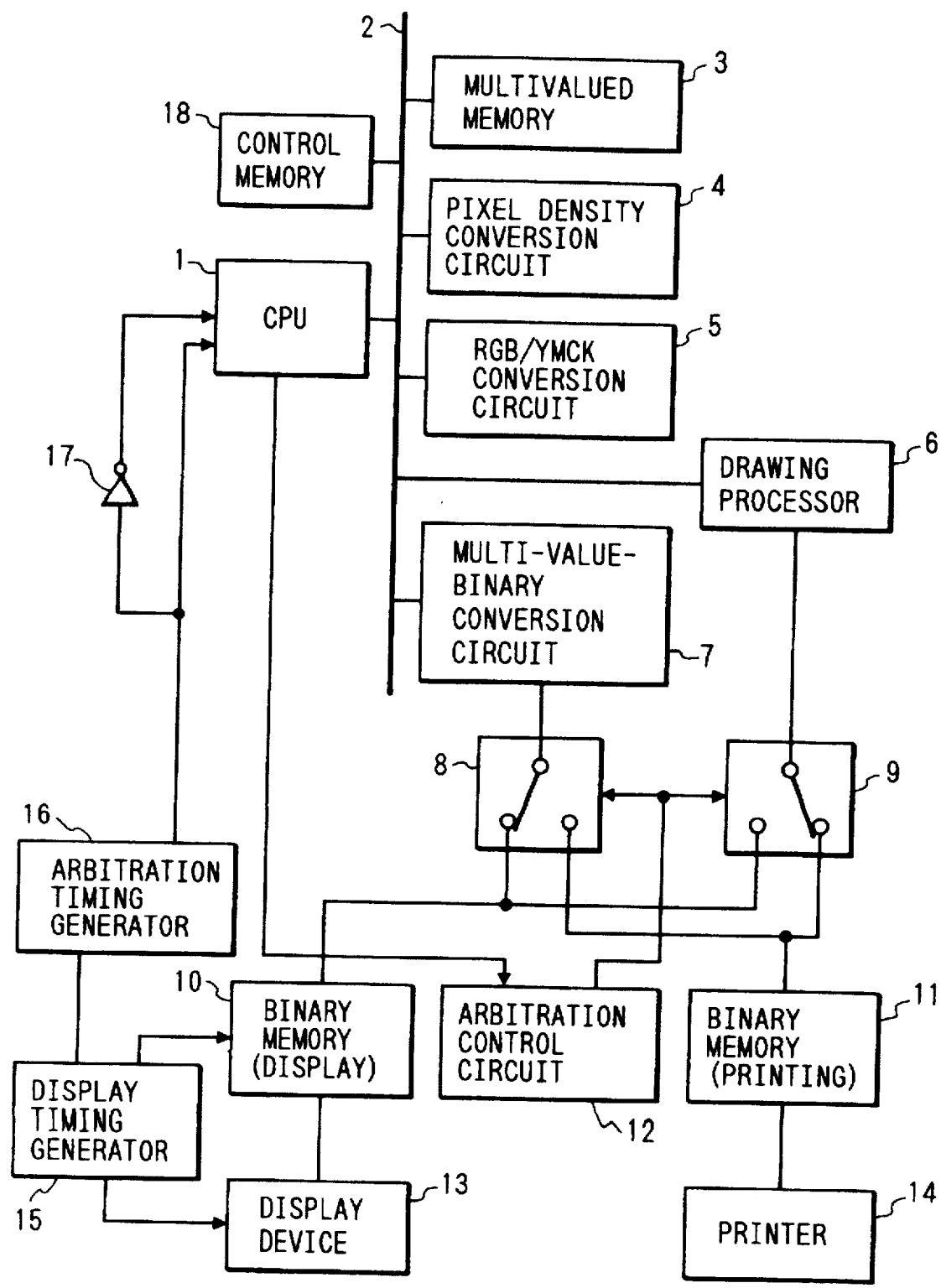
FIG. 1 is a block diagram showing the overall arrangement of an information processing apparatus according to the first embodiment.

FIG. 1 is a block diagram showing the overall arrangement of an image processing apparatus according to the first embodiment of the present invention.

Referring to FIG. 1, a CPU 1 generates various display data and various printing data, and controls the respective components such as a pixel density conversion circuit 4, an RGB/YMCK conversion circuit 5, and a multi-value-binary conversion circuit 7.

A bus 2 connects the CPU 1 to various peripheral circuits.

A multivalued memory 3 stores a natural image and a vector graphics text expressed as a multivalued image.

The image density conversion circuit 4 pixel-density-converts multivalued data (e.g., a natural image) whose predetermined resolution is already determined in data preparation. The detailed processing contents of the pixel density conversion circuit 4 are analog interpolation and thinning.

A display device 13 normally expresses a color image using RGB data. A printer 14 expresses a color image using YMCK data, and the RGB/YMCK conversion circuit 5 is used to convert the RGB data into YMCK data. The RGB/YMCK conversion circuit 5 is therefore used to prepare printing data.

A drawing processor 6 receives various commands from the CPU 1 and draws vector graphics commands and outline fonts. The drawing processor 6 is connected to binary memories 10 and 11 through a switching circuit or switch 9. In the display mode, the drawing processor 6 can draw colors expressed by R, G, and B components. In the printing mode, the drawing processor 6 can draw colors expressed by Y, M, C, and K components.

The multi-value-binary conversion circuit 7 converts data from the multivalued memory 3 into binary data. The resultant binary data is stored in the display binary memory 10 or the printing binary memory 11. In this embodiment, an error diffusion method is used as a multi-value-binary conversion method. This method is a known method, and a detailed description thereof will be omitted.

A switch 8 and the switch 9 supply data from the multi-value-binary conversion circuit 7 and the drawing processor 6 to the display binary memory 10 and the printing binary memory 11, respectively. The switches 8 and 9 are complementarily controlled through an arbitration control circuit 12. More specifically, when the switch 8 selects multi-value-binary conversion, the switch 9 selects the drawing processor. The display binary memory 10 is a video dual port RAM in this embodiment.

The arbitration control circuit 12 controls the switches 8 and 9 in accordance with signals from the CPU 1.

The display device 13 is a high-resolution flat panel display capable of receiving binary R, G, and B values and expressing a color image in eight colors.

The printer 14 is an ink-jet printer capable of receiving binary Y, M, C, and K values and expressing a color image in seven colors.

The structure of the ink-jet printer suitably applied in this embodiment will be described with reference to FIGS. 10 and 11. Note that a printer used in this embodiment is not limited to an ink-jet printer.

Figure 10:
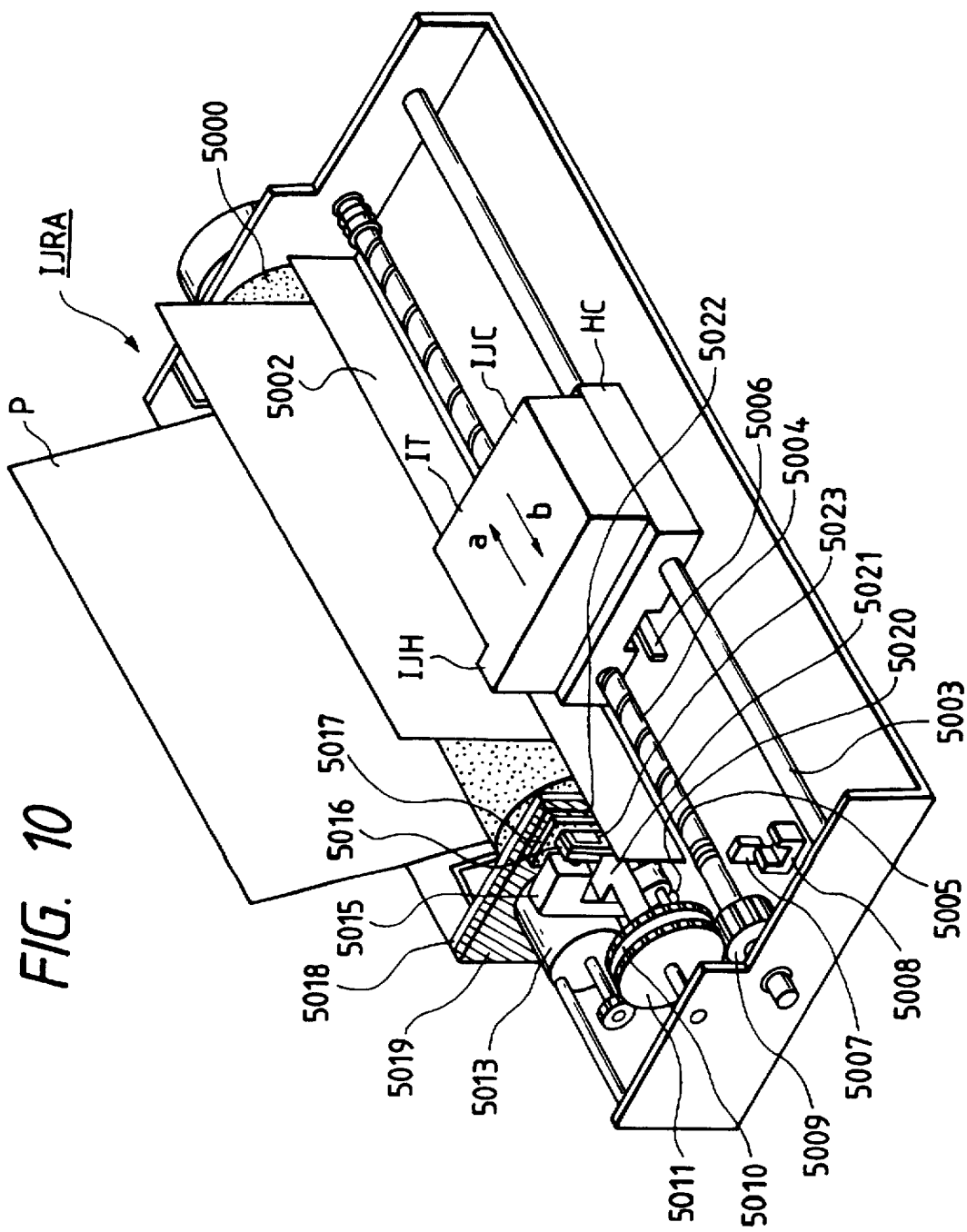
FIG. 10 is a perspective view showing the structure of an ink-jet printer.

FIG. 10 is a perspective view showing the structure of the ink-jet printer applicable to the present invention. Referring to FIG. 10, a carriage HC is engaged with a helical groove 5005 of a lead screw 5004 interlocked with forward and reverse rotations of a drive motor 5013 and rotated through driving force transmission gears 5011 and 5009. The carriage HC has a pin (not shown) and can be reciprocated in directions indicated by arrows a and b. An ink-jet cartridge IJC is mounted on the carriage HC. A paper press plate 5002 urges a recording sheet against a platen 5000 in a carriage moving direction. Photocouple 5007 and 5008 confirms the presence of a carriage lever 5006 to detect the home position for rotational direction switching of the motor 5013. A member 5016 supports a cap member 5022 for capping the entire surface of a recording head. A suction portion 5015 draws the recording material from the head into the cap, thus performing a suction recovery of the recording head, through an opening 5023 in the cap member 5022. A cleaning blade 5017 can be moved back and forth by a member 5019. A main body support plate 5018 supports the cleaning blade 5017 and the member 5019. A lever 5021 is used to start suction in suction recovery and is moved upon movement of a cam 5020 engaged with the carriage. The movement of the lever 5021 is controlled by a clutch which switches the driving force from the drive motor.

Capping, cleaning, and suction recovery are performed at corresponding positions by the lead screw 5004 when the carriage enters the home-position area. The capping, cleaning, and suction recovery are desirably performed at known timings.

Figure 11:
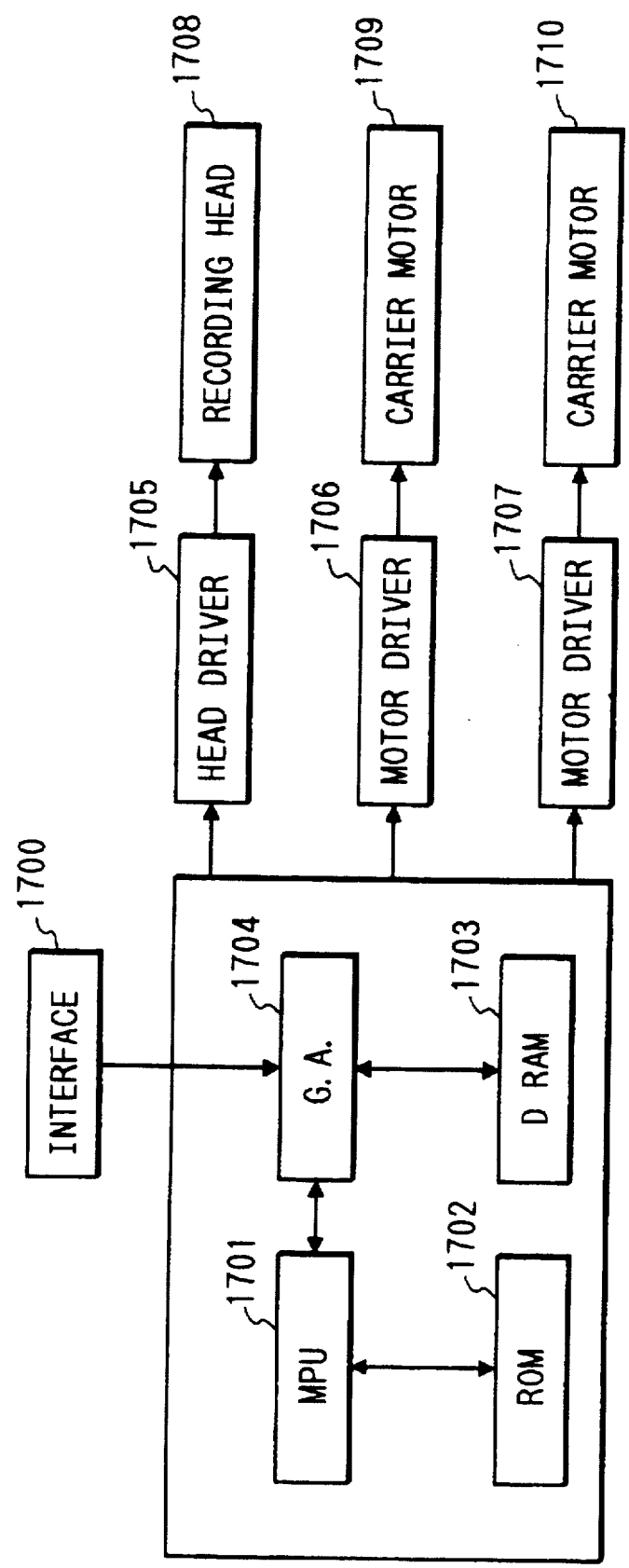
FIG. 11 is a block diagram showing the ink-jet printer.

FIG. 11 is a block diagram showing the control arrangement of the ink-jet printer shown in FIG. 10.

Referring to FIG. 11, this control arrangement includes an interface 1700 for inputting a recording signal. A program ROM 1702 stores control programs executed by an MPU 1701. A DRAM 1703 stores various data (e.g., the recording signal and recording data supplied to the head). A gate array 1704 controls supply of recording data to a recording head 1708 and also controls data transfer between the interface 1700, the MPU 1701, and the DRAM 1703. A carrier motor 1710 moves the recording head 1708. A carrier motor 1709 feeds a recording sheet. A head driver 1705 drives the recording head 1708 to eject recording material. A motor driver 1706 drives the carrier motor 1709. A second motor driver 1707 drives the carrier motor 1710.

In the printer having the above arrangement, when a recording signal is input from a host computer through the interface 1700, the recording signal is converted into printing recording data between the gate array 1704 and the MPU 1701. The motor drivers 1706 and 1707 are driven, and at the same time the recording head 1708 is driven in accordance with the recording data sent to the head driver 1705, thereby printing information.

Referring again to FIG. 1, a display timing generator 15 transfers data from the display binary memory 10 to the display device 13 in accordance with a timing requested by the display device 13.

An arbitration timing generator 16 generates a switching timing between display data and printing data in accordance with the display timing. An inverter 17 inverts the timing of the arbitration timing generator 16.

A control memory 18 stores various control data and programs serving as control sequences of the CPU 1 which include processing sequences to be described later with reference to the flow charts shown in FIGS. 5 and 6.

Figure 2:
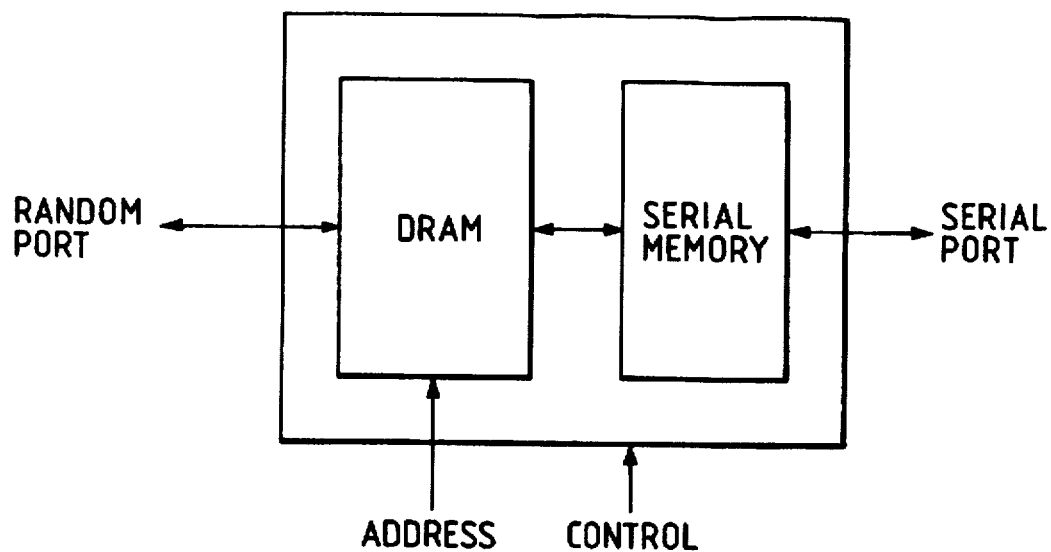
FIG. 2 is a block diagram showing a video dual port memory used in the first embodiment.

FIG. 2 shows a video dual port memory used as the display binary memory 10.

As can be apparent from FIG. 2, the video dual port memory has a random port and a serial port. When an appropriate control signal is applied to the video dual port memory, some data in a DRAM can be transferred to a serial memory. Once the data is transferred to the serial memory, this data can be output as serial data in response to a serial clock independently of the DRAM. In this embodiment, the random port is connected to the switches 8 and 9, and the serial port is connected to the display device 13.

Figure 3:
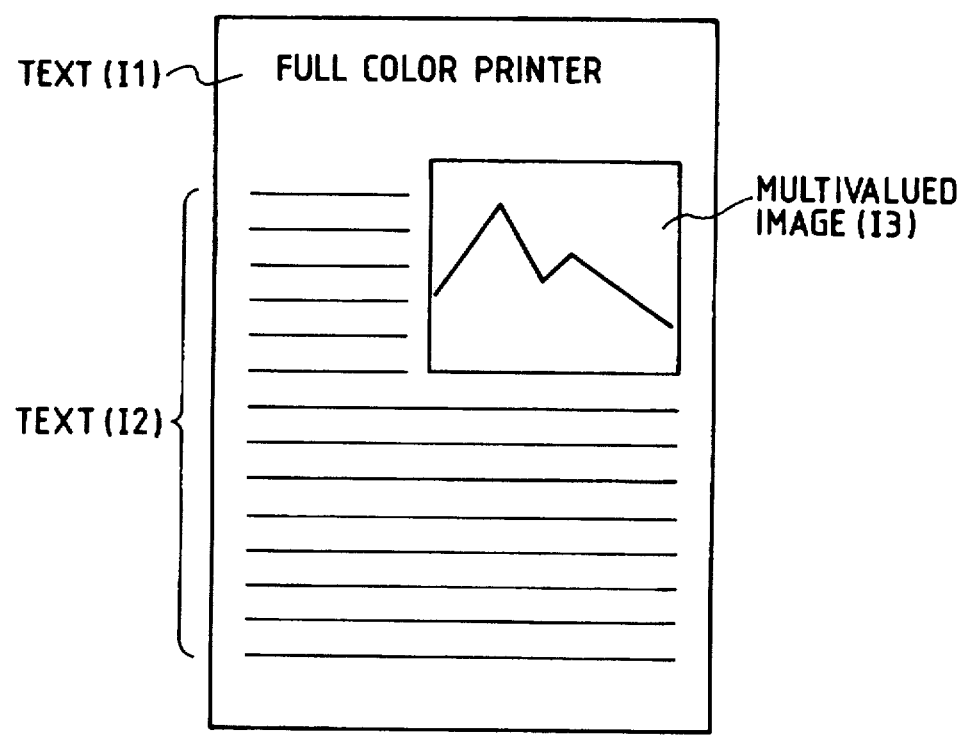
FIG. 3 is a view showing a printing example of the first embodiment.

FIG. 3 shows an image obtained by this embodiment. This image is output to the display device 13 or the printer 14.

Referring to FIG. 3, a color text I1 represents "FULL COLOR PRINTER" in a large font. Since the color text I1 is expressed by multivalued data, it is stored in the multivalued memory 3 under the control of the CPU 1. This data is then stored in the binary memory by the multi-value-binary conversion circuit 7. A text I2 is the main body of this output. The drawing processor can be used because the sentences of the text I2 are printed in black. In actual applications, this form is assumed to be most popular, and it is effective to use a drawing processor. A natural image I3 is a mountain picture. This image is read using a scanner and has the same resolution as that in the printer. To display this image on the display device 13, the image is density-converted by the pixel density conversion circuit 4.

Figure 4:
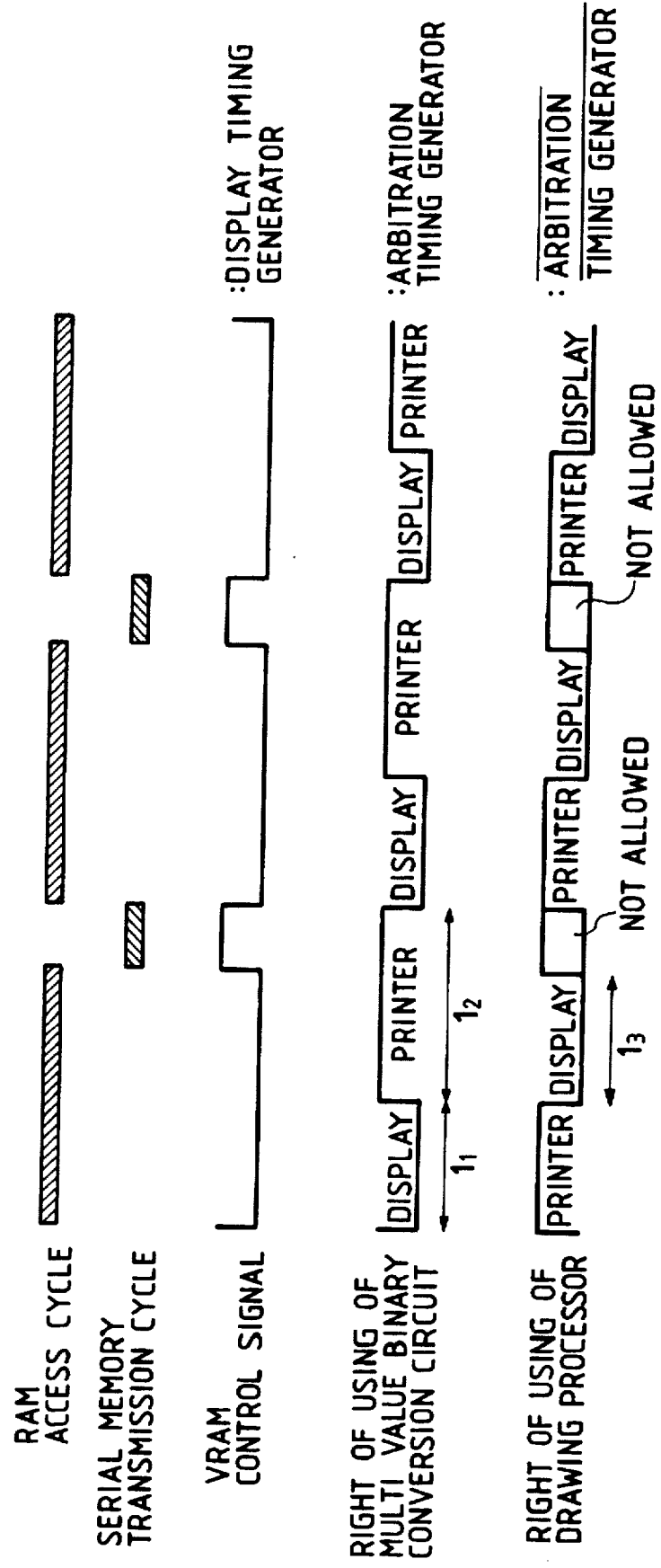
FIG. 4 is a timing chart showing times of use of a multi-value-binary conversion circuit and a drawing processor in the first embodiment.

FIG. 4 is a timing chart showing the right of using of the multi-value-binary conversion circuit 7 and the drawing processor 6. As described with reference to FIG. 2, the serial memory is used in display data transfer in this embodiment. As shown in FIG. 4, the RAM access cycle is defined in accordance with a VRAM control signal output from the display timing generator 15. During the RAM access cycle, the display binary memory 10 can be used. A timing representing the right of using of the multi-value-binary conversion circuit 7 is generated by the arbitration timing generator.

An interval $1_1$ represents an interval of using for preparing display data in the multi-value-binary conversion circuit and an interval of preparing printing data of the drawing processor. An interval $1_2$ represents an interval of preparing printing data to the multi-value-binary conversion circuit. An interval $1_3$ represents an interval of preparing display data to the drawing processor.

A method of controlling the CPU 1 to prepare display or printing data will be described with reference to flow charts.

Figure 5:
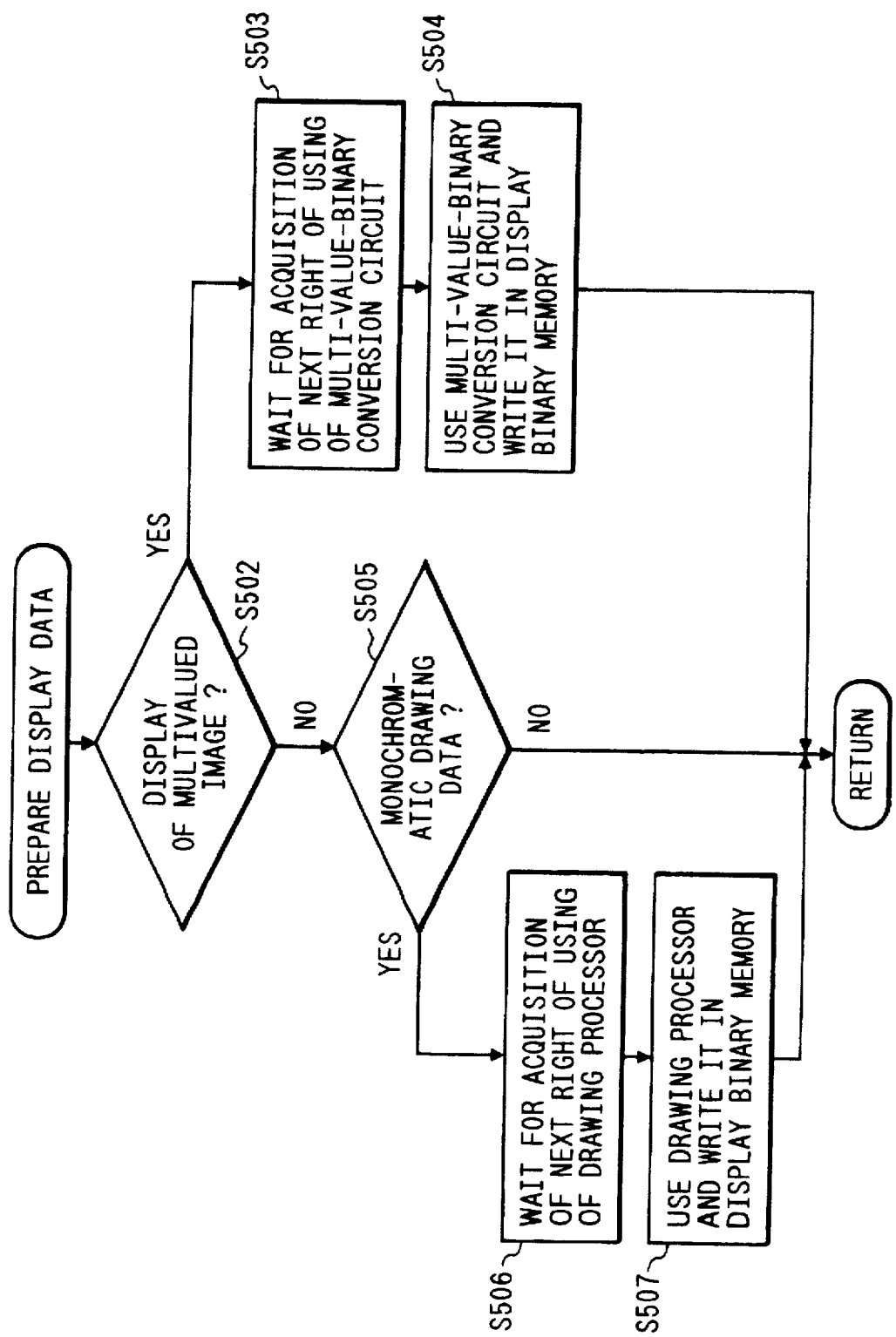
FIG. 5 is a flow chart for preparing display data in the first embodiment.

FIG. 5 is a flow chart for preparing the display data.

It is determined in step S502 whether a multivalued image is displayed. If YES in step S502, the CPU 1 waits for acquisition of the next right of using of the multi-value-binary conversion circuit in step S503. Since the time of the right of using is allowed only for the time interval $1_1$, the drawing time is synchronously managed in this manner.

As the time is reached, the multi-value-binary conversion circuit 7 is used to write or draw data in the display binary memory 10 in step S504. If the time interval $1_1$ is short as the drawing time, the CPU 1 waits for acquisition of the next right of using of the multi-value-binary conversion circuit 7 and then writes the remaining data. If an image is not a multivalued image, the CPU 1 determines in step S505 whether the data is monochromatic drawing data. If YES in step S505, the CPU 1 waits for acquisition of the next right of using of the drawing processor 6 in step S506 because the drawing time is limited to the time interval $1_3$ as in step S503.

In step S507, the drawing processor 6 is used to write drawing data in the display binary memory 10.

Figure 6:
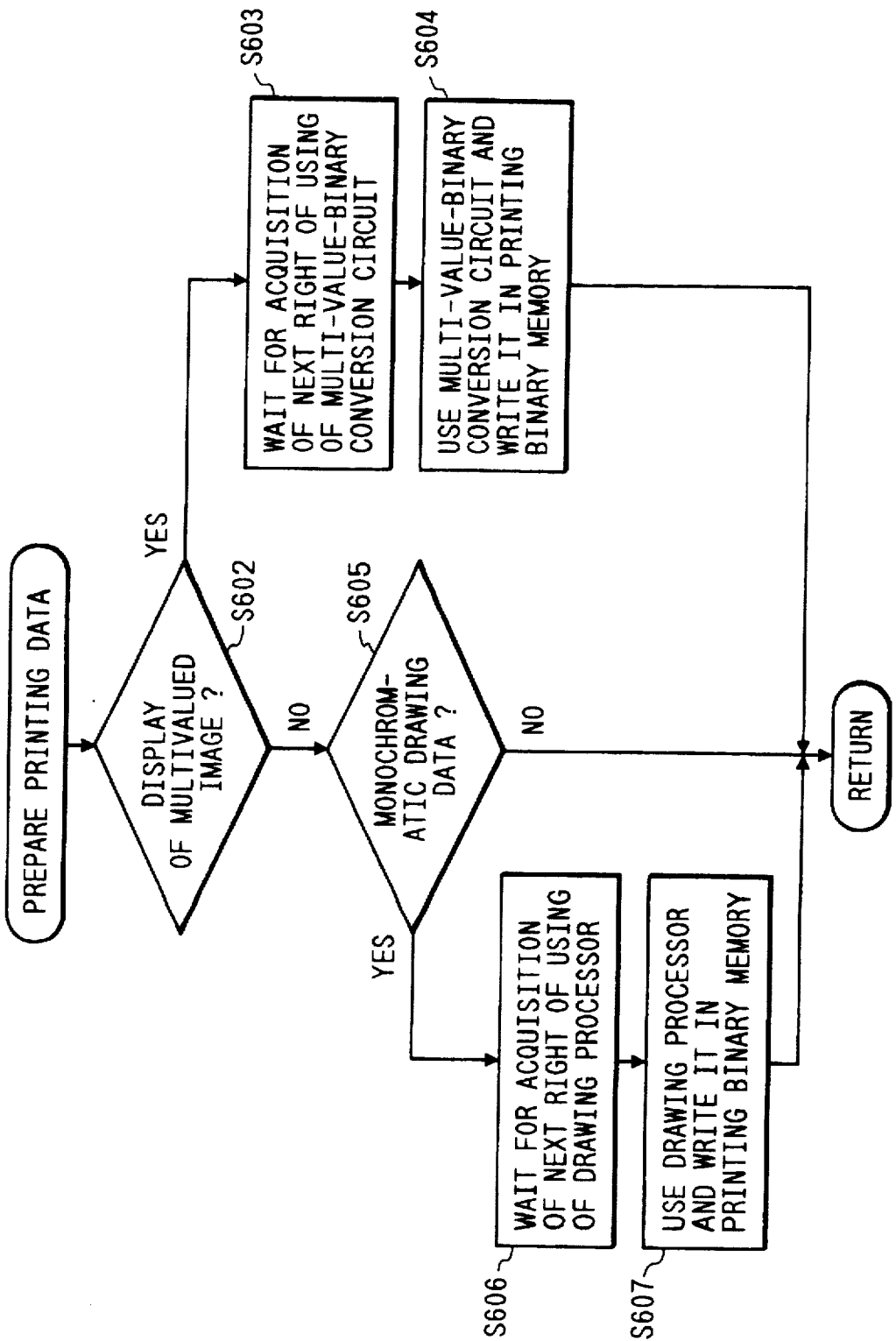
FIG. 6 is a flow chart for preparing printing data in the first embodiment.

FIG. 6 is a flow chart for preparing the printing data.

The CPU 1 checks in step S602 whether to print a multivalued image. If YES in step S602, the CPU 1 waits for acquisition of the next right of using of the multi-value-binary conversion circuit 7 in step S603 because the time of the right of using the multi-value-binary conversion circuit 7 is allowed only for the time interval $1_2$, and the drawing time must be synchronously managed.

As the time is reached in step S604, the multi-value-binary conversion circuit 7 is used to write or draw data in the printing binary memory 11. If the time interval $1_2$ is short as the drawing time, the CPU 1 waits for acquisition of the next right of using of the multi-value-binary conversion circuit 7, and then restarts drawing. If the image is determined not to be a multivalued image, the CPU 1 checks in step S605 whether the data is monochromatic drawing data. If YES in step S605, the CPU 1 waits for acquisition of the next right of using of the drawing processor in step S606 because the drawing time is limited to the time interval $1_3$ as in step S603. In step S607, the drawing processor 6 is used to store the drawing data in the printing binary memory 11.

[Second Embodiment]

Figure 7:
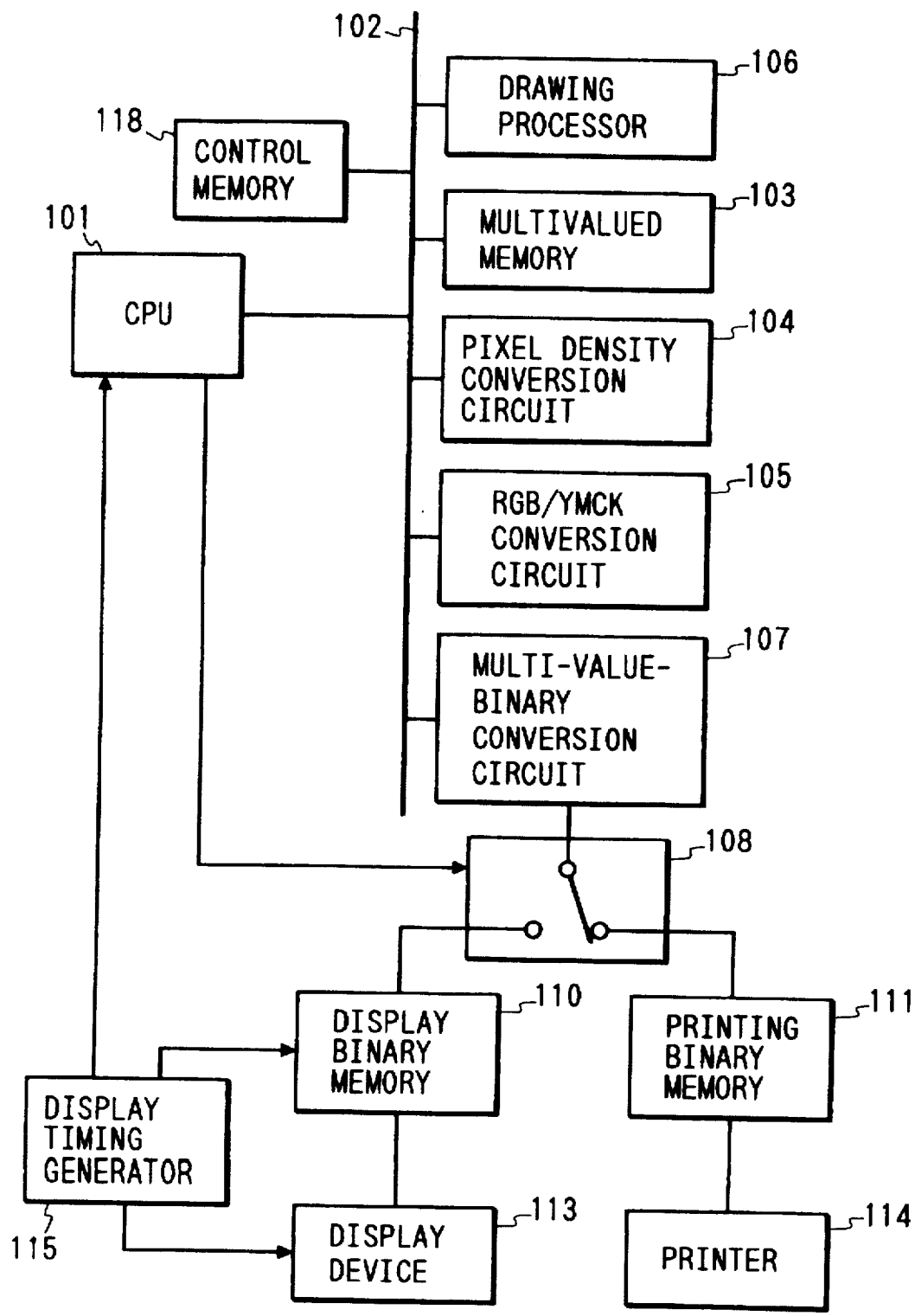
FIG. 7 is a block diagram showing the overall arrangement of an information processing apparatus of the second embodiment.

FIG. 7 is a block diagram showing the overall arrangement of an apparatus according to the second embodiment of the present invention.

Similar reference numerals as in the first embodiment in FIG. 1 (but increased by 100) denote the same parts in FIG. 7, and a detailed description thereof will be omitted.

A CPU 101 prepares various display and printing data and controls a pixel density conversion circuit 104, an RGB/YMCK conversion circuit 105, a multi-value-binary conversion circuit 107, and the like. In this embodiment, arbitration is not performed by timing signals from an external circuit, but by programs of the CPU 101. An arbitration method such as printing time priority or display speed priority can thus be easily changed.

A bus 102 is identical to the bus 2 in FIG. 1. A multivalued memory 103 is different from the multivalued memory 3 in FIG. 1 except that the memory 103 stores an output from a drawing processor 106.

The pixel density conversion circuit 104 and the RGB/YMCK conversion circuit 105 are identical to the circuits having the same names in FIG. 1, and a detailed description thereof will be omitted.

The drawing processor 106 receives various commands from the CPU 101 and performs drawing of vector graphics commands, outline fonts, and the like. The drawing processor 106 is different from that in FIG. 1 except that the processor 106 is connected to the multivalued memory 103.

A switch 108 supplies data from the multi-value-binary conversion circuit 107 to a display binary memory 110 and a printing binary memory 111. The display binary memory 110 comprises a video dual port RAM.

The apparatus of the second embodiment also includes a display device 113, a printer 114, and a display timing generator 115.

A control memory 118 stores various control data and programs serving as control sequences of the CPU 101 which include processing sequences to be described later with reference to a flow chart in FIG. 9.

Figure 8:
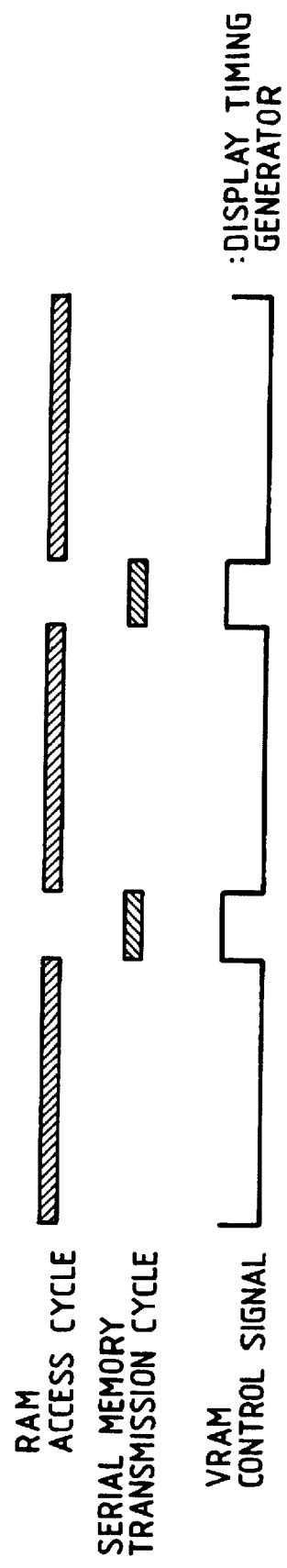
FIG. 8 is a timing chart showing VRAM timings in the second embodiment.

FIG. 8 is a timing chart showing the rights of using of the multi-value-binary conversion circuit 107 and the drawing processor 106. The timing chart in FIG. 8 is different from that in FIG. 4 only in that the timing signal from the display timing generator 115 is required, and fine waveforms of the arbitration timing generator are not required.

In a RAM access cycle, display or image data can be prepared by the CPU 101 during the entire time interval. Arbitration is performed by software under the control of the CPU 101.

Figure 9:
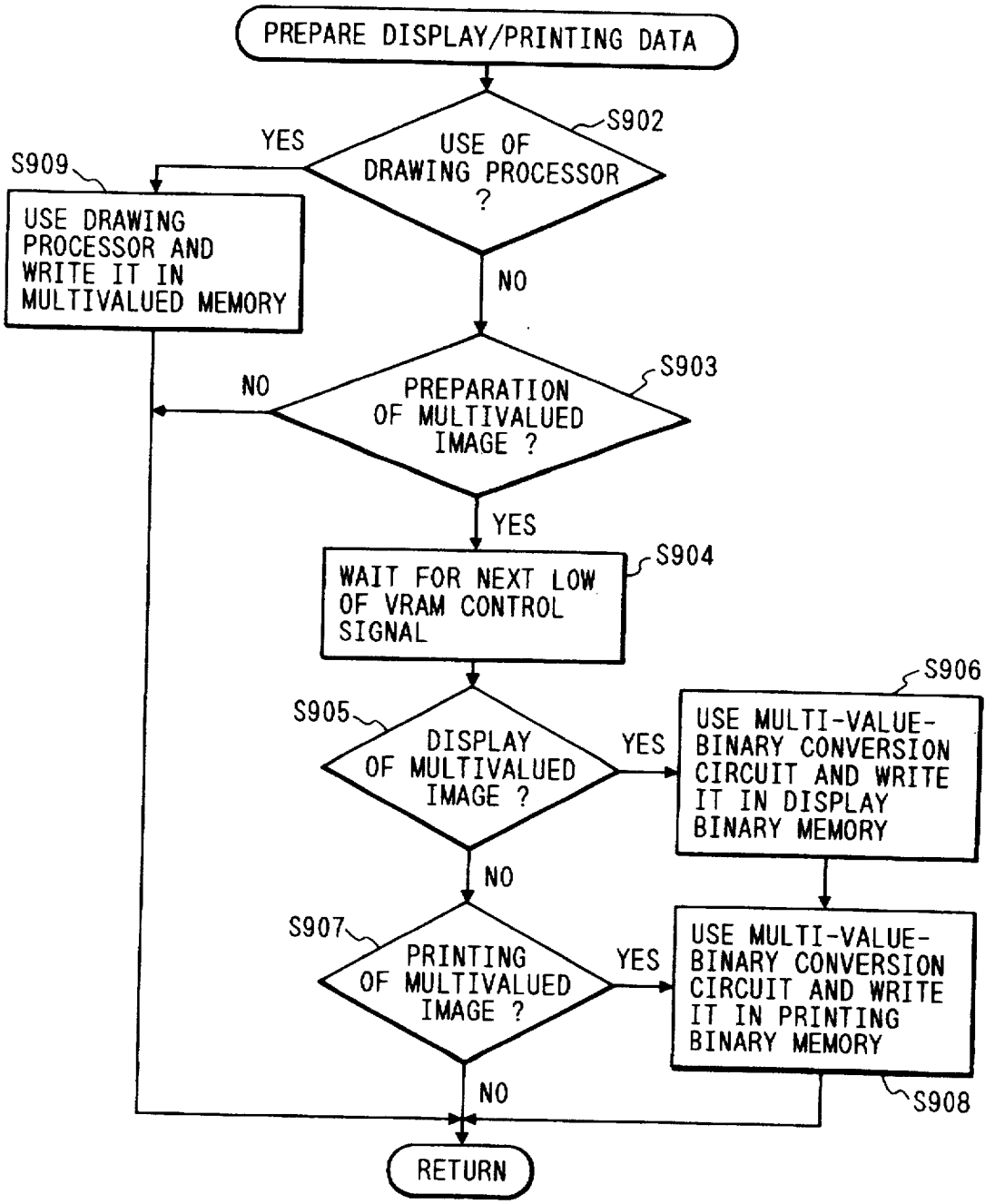
FIG. 9 is a flow chart for preparing display/printing data in the second embodiment.

FIG. 9 is a flow chart for explaining a method of controlling the CPU 101 to prepare the display or printing data.

The CPU 101 determines in step S902 whether the drawing processor 106 is used. If YES in step S902, the drawing processor 106 is used to write or draw the data in the multivalued memory 103 in step S909.

If NO in step S902, the CPU 101 determines in step S903 whether a multivalued image is to be prepared. If YES in step S903, the CPU 101 waits for next "low" of a VRAM control signal in step S904. The CPU 101 then determines in step S905 whether a multivalued image is to be displayed. If YES in step S905, the multi-value-binary conversion circuit 107 is used to write data in the display binary memory 110 in step S906.

However, if NO in step S905, the CPU 101 determines in step S907 whether a multivalued image is to be printed. If YES in step S907, the multi-value-binary conversion circuit 107 is used to write or store data in the printing binary memory 111 in step S908.

The present invention is not limited to a single apparatus, but is applicable to a plurality of apparatuses if they can execute the function of the present invention. In addition, the present invention is also applicable to a system for performing processing through a network such as a LAN.

As described above, a multi-value-binary conversion circuit and a drawing processor can be commonly used under an assumption that binary colors are displayed on the display device and printed at the printer. Even if 16 million colors are used, high-speed processing can be performed without increasing the video memory size.

An apparatus according to the present invention requires a smaller number of additional circuits than that of a conventional multivalued data display/printing system. Therefore, a low-cost processing apparatus flexibly compatible with various applications can be realized.

Although the present invention has been described in this preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An image processing apparatus comprising:

multivalued storage means for storing a multivalued image;

display binary image storage means for storing a display binary image;

binary image display means for displaying a binary image from said display binary image storage means;

printing binary image storage means for storing a printing binary image;

binary image printing means for printing an image from said printing binary image storage means;

multi-value-binary converting means for converting the multivalued image from said multivalued image storage means into a binary image; and control means for alternately generating a first period with a first length and a second period with a second length, wherein said control means controls said multi-value-binary converting means and said display binary image storage means in such a manner that said multi-value-binary converting means connects and transmits the binary image to said display binary image storage means in the first period, said multi-value-binary converting means connects and transmits the binary image to said printing binary image storage means in the second period, and said display binary image storage means transmits binary image to said binary image display means in the second period.

2. An apparatus according to claim 1, wherein said control means connects said printing binary image storage means to said multi-value-binary converting means more preferentially than said display binary image storage means when a printable binary image is not stored in said printing binary image storage means.

3. An apparatus according to claim 1, wherein the binary image information and the multivalued image information represent color images.

4. An apparatus according to claim 3, further comprising an RGB/YMCK conversion circuit for converting the multivalued image from said multivalued storage means to prepare printing multivalued data to be converted by said multi-value-binary converting means.

5. An apparatus according to claim 1, further comprising:

drawing processing means for performing drawing in accordance with a command; and second control means for selectively connecting said drawing processing means to said display binary image storage means or said printing binary image storage means.

6. An apparatus according to claim 5, wherein, when said control means connects either of said display binary image storage means or said printing binary image storage means to said multi-value-binary converting means, said second control means connects the other means to said drawing processing means.

7. An apparatus according to claim 1, further comprising density converting means for pixel-density converting the multivalued image from said multivalued image storage means prior to conversion of the multivalued image into the binary image by said multi-value-binary converting means.

8. An apparatus according to claim 5, further comprising prohibiting means for prohibiting said drawing processing means from performing drawing while binary image data is being transferred from said display binary image storage means to said binary image display means.

9. An apparatus according to claim 1, wherein said display binary image storage means includes a plurality of ports.

* * * * *